United States Patent
Cheng

(10) Patent No.: US 6,662,451 B1
(45) Date of Patent: Dec. 16, 2003

(54) HEDGE SHEARS

(75) Inventor: Kun-Chia Cheng, No. 6, Alley 74, Lane 87, Sec. 2, Chieh-Tung Rd., Changhwa City (TW)

(73) Assignees: Hung-Ta Huang, Taipei (TW); Kun-Chia Cheng, Changhwa (TW)

( * ) Notice: Subject to any disclaimer, the term of this patent is extended or adjusted under 35 U.S.C. 154(b) by 31 days.

(21) Appl. No.: 10/162,492

(22) Filed: Jun. 3, 2002

(51) Int. Cl.[7] .......................... B26B 17/00; B26B 13/00
(52) U.S. Cl. ............................................ 30/199; 30/177
(58) Field of Search .......................... 30/199, 177, 252, 30/320, 321

(56) References Cited

U.S. PATENT DOCUMENTS

| | | | | |
|---|---|---|---|---|
| 733,919 A | * | 7/1903 | Schwartz | 30/252 |
| 852,479 A | * | 5/1907 | Weiss | 30/177 |
| 869,949 A | * | 11/1907 | Westerdahl | 30/321 |
| 896,602 A | * | 8/1908 | Weiss | 30/177 |
| 1,890,355 A | * | 12/1932 | Bailey | 30/321 |
| 2,020,242 A | * | 11/1935 | Gedded | 30/177 |
| 3,422,532 A | * | 1/1969 | Ballard | 30/252 |
| 3,641,669 A | * | 2/1972 | Keiser, Jr. | 30/260 |
| 3,760,500 A | * | 9/1973 | Eads et al. | 30/268 |
| D297,905 S | * | 10/1988 | Ishida et al. | D8/5 |
| 5,317,806 A | * | 6/1994 | Held et al. | 30/249 |
| 6,105,257 A | * | 8/2000 | Rutkowski et al. | 30/199 |
| 6,249,976 B1 | * | 6/2001 | Osame | 30/199 |

* cited by examiner

Primary Examiner—Allan N. Shoap
Assistant Examiner—Jason Prone
(74) Attorney, Agent, or Firm—Alan D. Kamrath; Rider Bennett, LLP

(57) ABSTRACT

Hedge shears has a pair of hands, a pair of blades and a rotatable connector secured between the handles and the blades. Each handle has a handle drive slot and each blade has a blade drive slot. The rotatable connector consists of two connecting plates. Each connecting plate has an elongated hole defined in the connecting plate and has a transverse abutting plate formed on an edge of the connecting plate adjacent to the transverse abutting plate of the other connecting plate. A pivot hole is defined in each abutting plate, and a shaft passes through the pivot holes. Two shaft hubs hold opposite ends of the shaft, and a pin secured under each hub passes through the drive slots in the handles or the blades. The blades are able to rotate around the shaft and be operated by the handles by moving the shaft longitudinally.

12 Claims, 6 Drawing Sheets

HEDGE SHEARS

BACKGROUND OF THE INVENTION

1. Field of the Invention

The present invention relates to hedge shears, and more particularly to hedge shears having rotatable blades to adjust the cutting angle of the hedge shears.

2. Description of Related Art

Hedge shears are used quite often to trim or sculpt shrubbery or hedges and are particularly useful to people with flower gardens or landscaped yards.

With reference to FIG. 6, conventional hedge shears (50) comprise a pair of handles (52, 54) and a pair of blades (522, 544). Each handle (52, 54) is firmly connected to one corresponding blade (522, 542) to form one arm (not numbered) of the shears (50). The two arms pivotally cross and are connected to each other at middle portions by a pivot pin (55). Therefore, when the handles (52, 54) are closed, the blades (522, 542) are driven together by the handles (52, 54) and cut.

However, conventional hedge shears (50) have the following drawbacks.

1. Because shrubs and hedge plants always have branches growing in different directions. Some branches will block branches that need to be trimmed, the hedge shears (50) have to be rotated to align the blades (522, 542) with the desired branches and avoid cutting other branches. Therefore, the user often has to change the position of the handles (52, 54) so the blades (522, 544) will make the correct cut. Consequently, the hedge shears can be very inconvenient to use.

2. Changing the position of the blades (522, 544) is particularly problematic when the user must stand on a ladder or is otherwise restricted in movement. The user easily gets tired when a great deal of effort is required to change position so either efficiency or productivity is sacrificed.

The present invention has arisen to mitigate and/or obviate the disadvantage of the hedge shears.

SUMMARY OF THE INVENTION

The main objective of the invention is to provide hedge shears that have rotatable blades the direction of the cut can be adjusted.

Other advantages and novel features of the invention will become more apparent from the following detailed description when taken in conjunction with the accompanying drawings.

DETAILED DESCRIPTION OF THE PREFERRED EMBODIMENT

Figure 1:
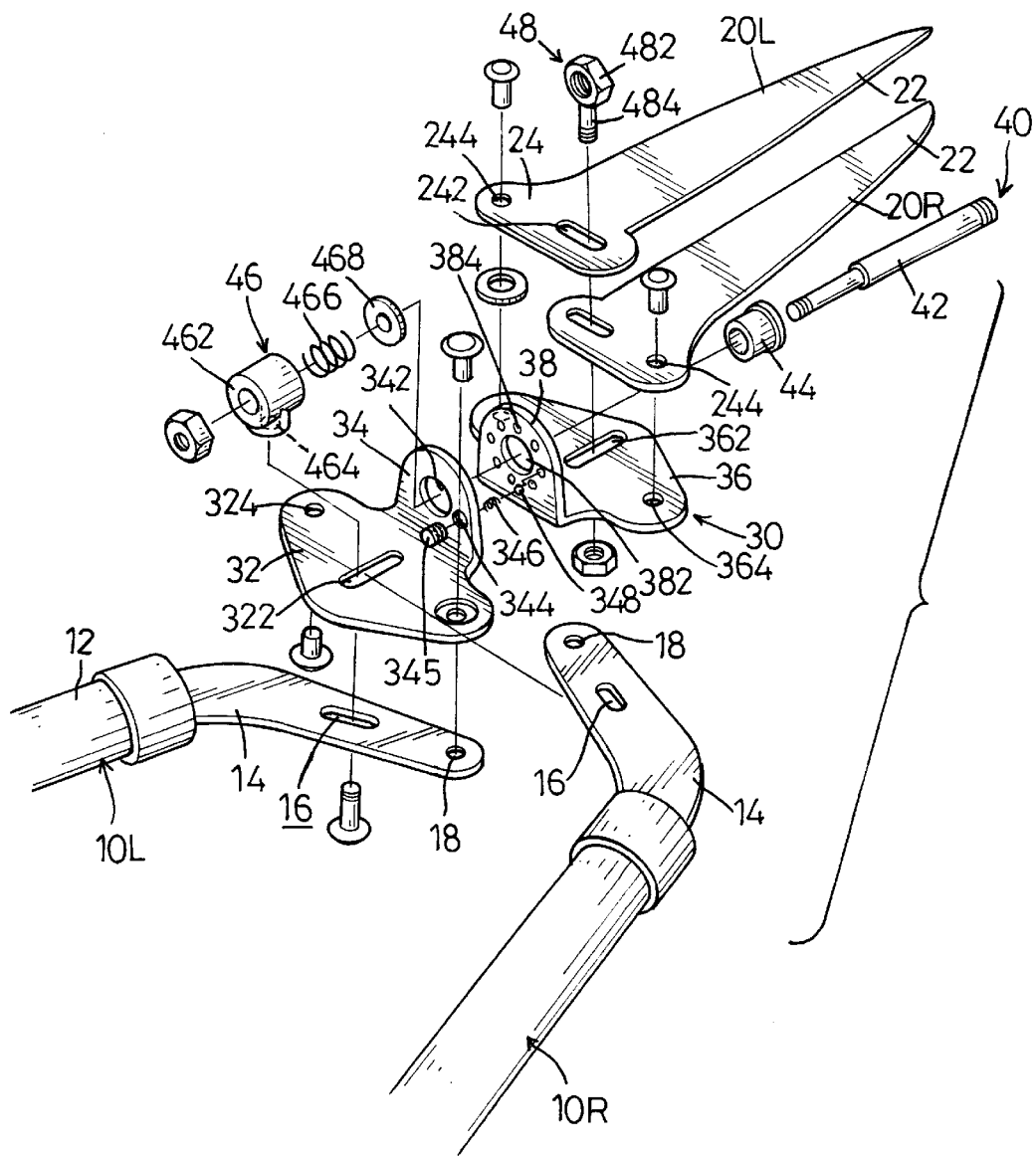
FIG. 1 is an exploded perspective view of hedge shears in accordance with the present invention.
Figure 2:
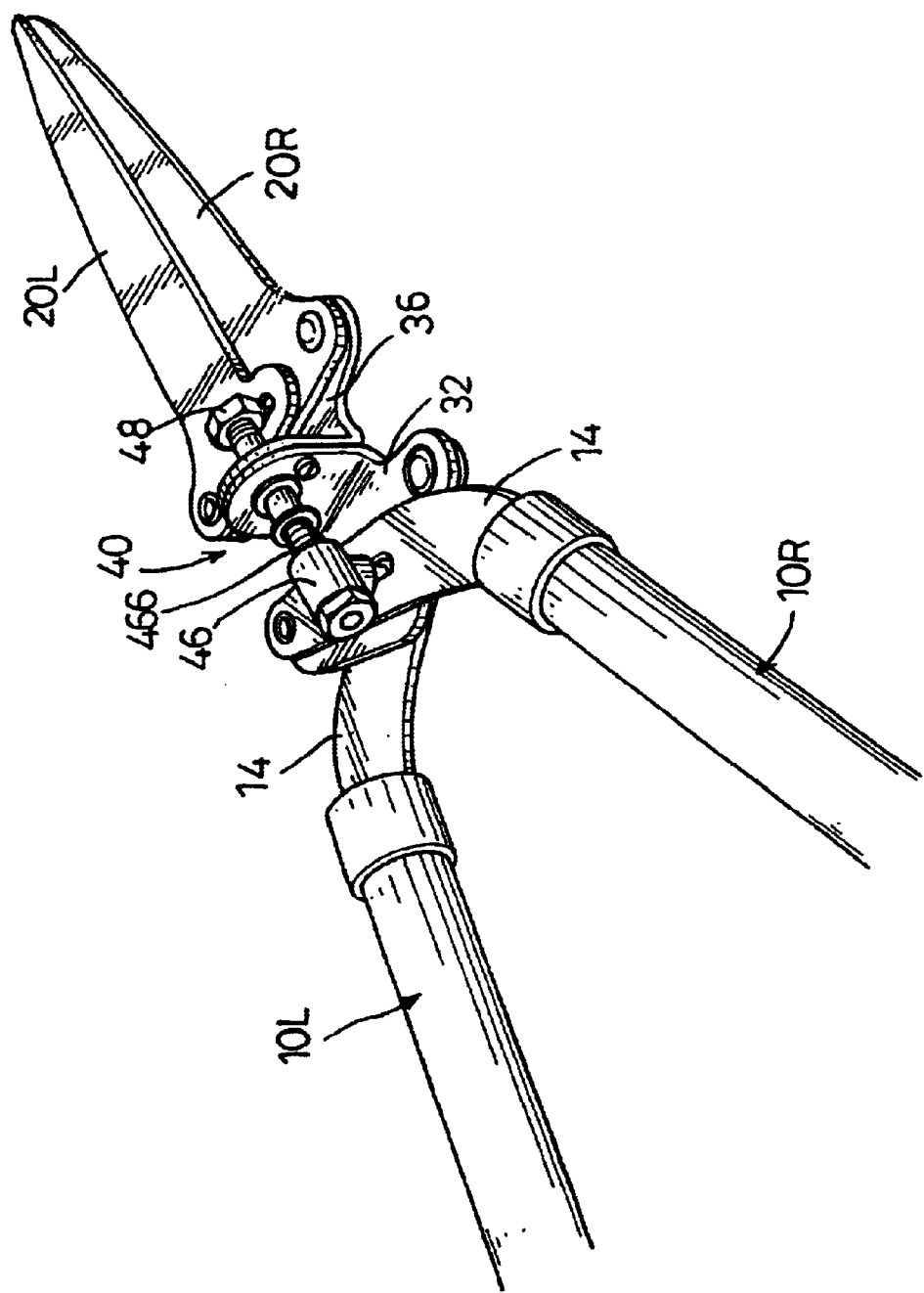
FIG. 2 is a perspective view of the hedge shears in FIG. 1.
Figure 3:
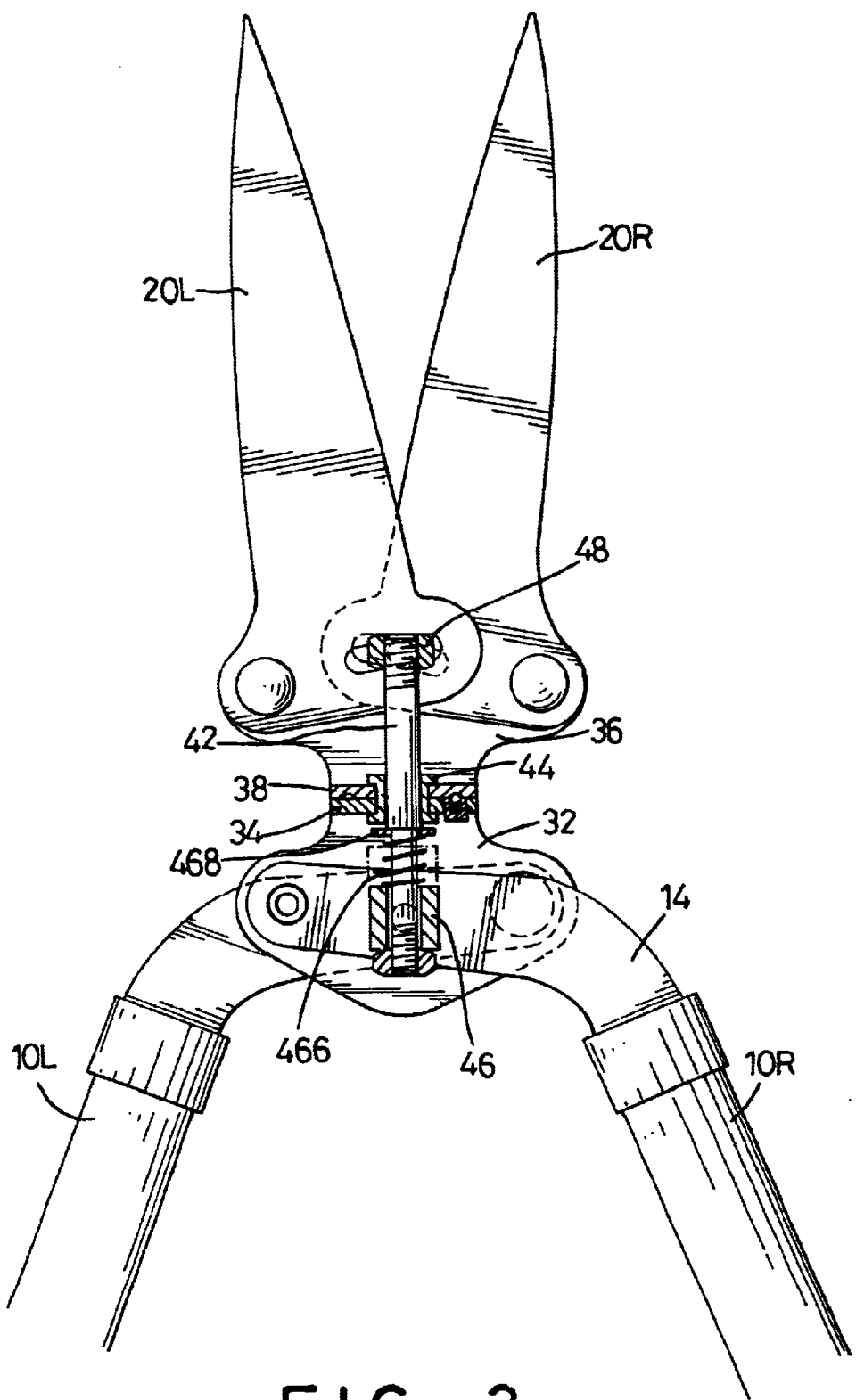
FIG. 3 is a top plan view in partial section of the hedge shears in FIG. 2.

With reference to FIGS. 1 to 3, hedge shears in accordance with the present invention comprises a pair of handles (10R, 10L), a pair of blades (20R, 20L) and a rotatable connector (30).

The handles (10R, 10L) are symmetrical, and each handle (10R, 10L) has a grip (12) and an attachment fitting (14). Each attachment fitting (14) has a proximal end attached to one end of a grip (12) and a distal end extending inward from each grip (12). A handle drive slot (16) is defined through a middle portion of each attachment fitting (14), and a handle pivot hole (18) is defined in the distal end of each attachment fitting (14).

Each blade (20R, 20L) is a long strip with a distal end (22) and an enlarged proximal end (24). A cutting edge (not numbered) is formed on an inner edge of each blade (20R, 20L), and a blade drive slot (242) is defined in the enlarged proximal end (24) of each blade (20R, 20L). A blade pivot hole (244) is defined in the enlarged proximal end (24).

The rotatable connector (30) bridges between the handles (10R, 10L) and the blades (20R, 20L) and consists of a handle drive bracket (32), a blade drive bracket (36), a positioning device (not numbered) and a pivoting device (40). The handle drive bracket (32) is L-shaped and has a rear transverse abutting plate (34) and a longitudinal handle drive plate (not numbered). The longitudinal handle drive plate has a front edge and two sides with a wing (not numbered) formed on each side. The rear transverse abutting plate (34) is formed on the front edge of the longitudinal drive plate. A first elongated hole (322) is defined in the longitudinal handle drive plate between the wings and parallel to the pivoting device (40). A handle fixing pivot hole (324) is defined in each wing of the longitudinal handle drive plate to align with the corresponding handle pivot hole (18) in the attachment fitting (14). A pivot pin such as a rivet (not numbered) is mounted in these pivot holes (324, 18) to connect the handle drive bracket (32) and the handles (10R, 10L) together. Additionally, the handle drive slots (16) in the attachment fittings (14) of the handles (10R, 10L) are aligned with the first elongated hole (322) in the longitudinal handle drive plate. A rear pivot shaft hole (342) is defined in the rear transverse abutting plate (34).

The blade drive bracket (36) is essentially the same as the handle drive bracket (32) and has a transverse front abutting plate (38) and a longitudinal blade drive plate (not numbered). The longitudinal blade drive plate has a rear edge and two sides with a wing (not numbered) formed on each side. A second elongated hole (362) is defined in the longitudinal blade drive plate parallel to the pivoting device (40). The blade drive slots (242) in the enlarged proximal end (24) of the blades (20R, 20L) align with the second elongated hole (362). A blade fixing pivot hole (364) is defined in each wing to align with the corresponding blade pivot holes (244) in the blades (20R, 20L). A pivot pin such as a rivet (not numbered) is mounted in each blade fixing pivot hole (364) and the corresponding blade pivot hole (244) to pivotally attach the blades (22) to the blade drive bracket (36). A pivot hole (382) is defined in the front transverse abutting plate (38).

The positioning device comprises a locking hole (344), multiple detents (384), a spring (346) and ball (348) combination and a setscrew (345). The locking hole (344) is defined in the rear transverse abutting plate (34). The detents (384) are defined in the front transverse abutting plate (38) in a circle to correspond to the locking hole (344). The spring (346) and ball (348) combination mounted in the locking hole (344). The ball (348) extends out of the locking hole (344) toward the front transverse abutting plate (38) and fits inside a corresponding detent (384). The setscrew (345) screwed into the locking hole (344) to press the spring (346) against the ball (348) inside the locking hole (344). When the rear transverse abutting plate (34) and the front transverse abutting plate (38) are aligned and pressed together, the spring (346) pushes the ball (348) inside the corresponding detent (384) to hold the blades (20R, 20L) in position.

The pivoting device (40) consists of a shaft (42), a bushing (44), a slidable rear hub (46) and a front hub (48). The bushing (44) has two ends with a flange (not numbered) formed on one end. The bushing (44) is mounted through the pivot shaft holes (342, 382) in the rear transverse and front transverse abutting plates (34, 38) such that the flange abuts the front transverse abutting plate (38). A flange (not numbered) is formed on the other end of the bushing (44) after the bushing (44) is mounted in the pivot haft holes (342, 382) to hold the rear transverse and the front transverse abutting plates (34, 38) together. The shaft (42) has two ends and is mounted in a through hole (not numbered) in the bushing (44).

The shaft (42) with a shoulder (not numbered) is held in place by the rear hub (46) and front hub (48). A pin (not numbered) is attached to the rear hub (46) and passes through the handle drive slots (16) and the first elongated hole (322) in the handle drive bracket (32). The rear hub (46) has a tubular ring (462) and a stub (464). The tubular ring (462) holds one end of the shaft (42), and the stub (464) is formed under the ring (462) with a threaded hole (not numbered) formed longitudinally in the stub (464). A long bolt (not numbered), passes through the handle drive slots (16) and the first elongated hole (322) and screws into the threaded hole. A spring (466) with a washer (468) is mounted between the tubular ring (462) and the washer (468), wherein the washer (468) is mounted around the rear end of the shaft (42) and pressed against the shoulder of the shaft (42).

The front hub (48) comprises a nut (482) and a rod (484) extending down from the nut (482). The front end of the shaft (42) screws into and is held in position by the nut (482). The rod (484) has a threaded free end that passes through the blade drive slots (242) and the second elongated hole (362) and is secured with another nut (not numbered) on the threaded free end.

Figure 4:
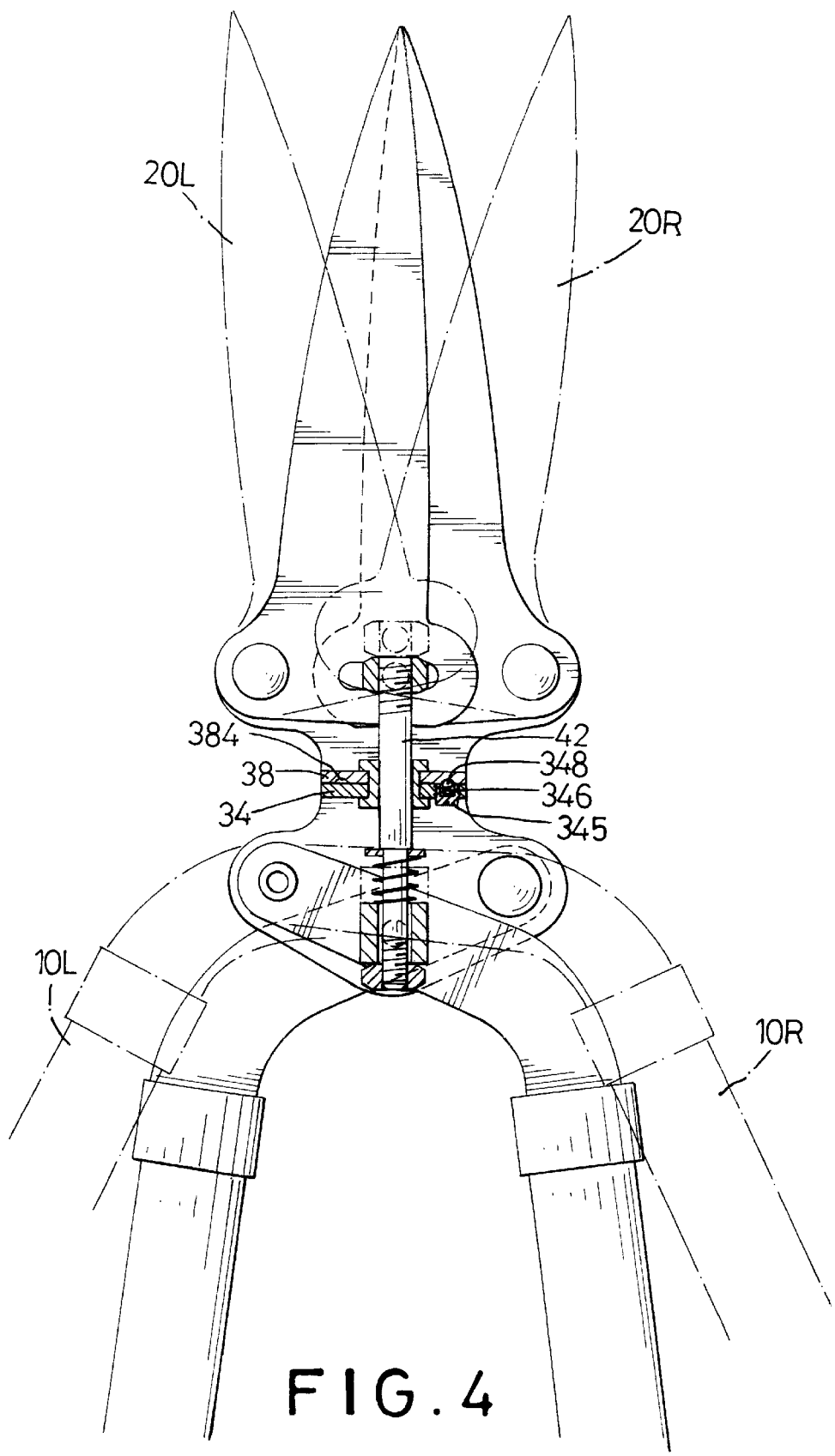
FIG. 4 is an operationally top plan view in partial section of the hedge shears in FIG. 2.

With reference to FIG. 4, the hedge shears are operated by repeatedly opening and closing the handles (10R, 10L). When the handles (10R, 10L) open, the long bolt in the rear hub (46) is pushed forward along the first elongated hole (322) by the handle drive slots (16). Therefore, the shaft (42) is pushed forward and the front hub (48) simultaneously moves forward along the second elongated hole (362) and the blade drive slots (242) thereby causing the blades (20R, 20L) to be forced apart. The blades (20R, 20L) are pulled together when the handles (10R, 10L) are closed. The spring (466) between the rear hub (46) and the rear transverse abutting plate (34) enables the hedge shears to close automatically.

Figure 5:
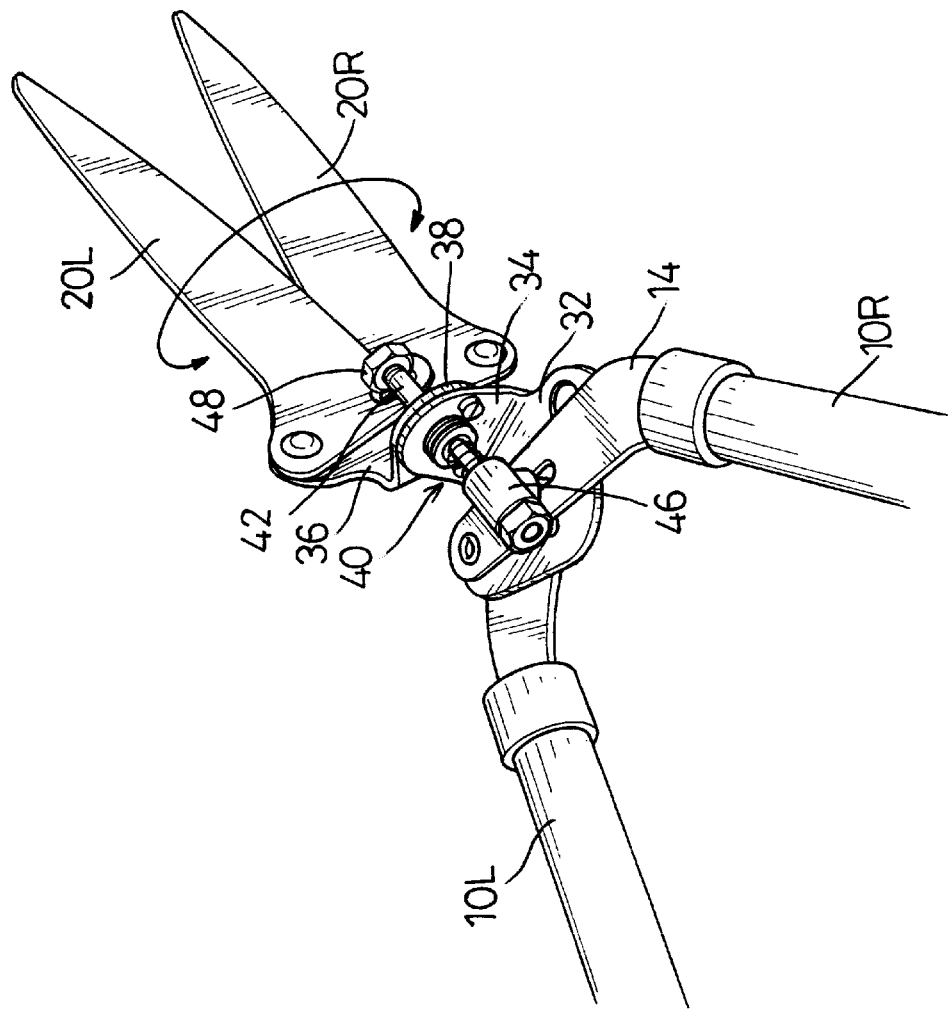
FIG. 5 is an operational perspective view of the hedge shears in FIG. 2 showing the blades rotated.
Figure 6:
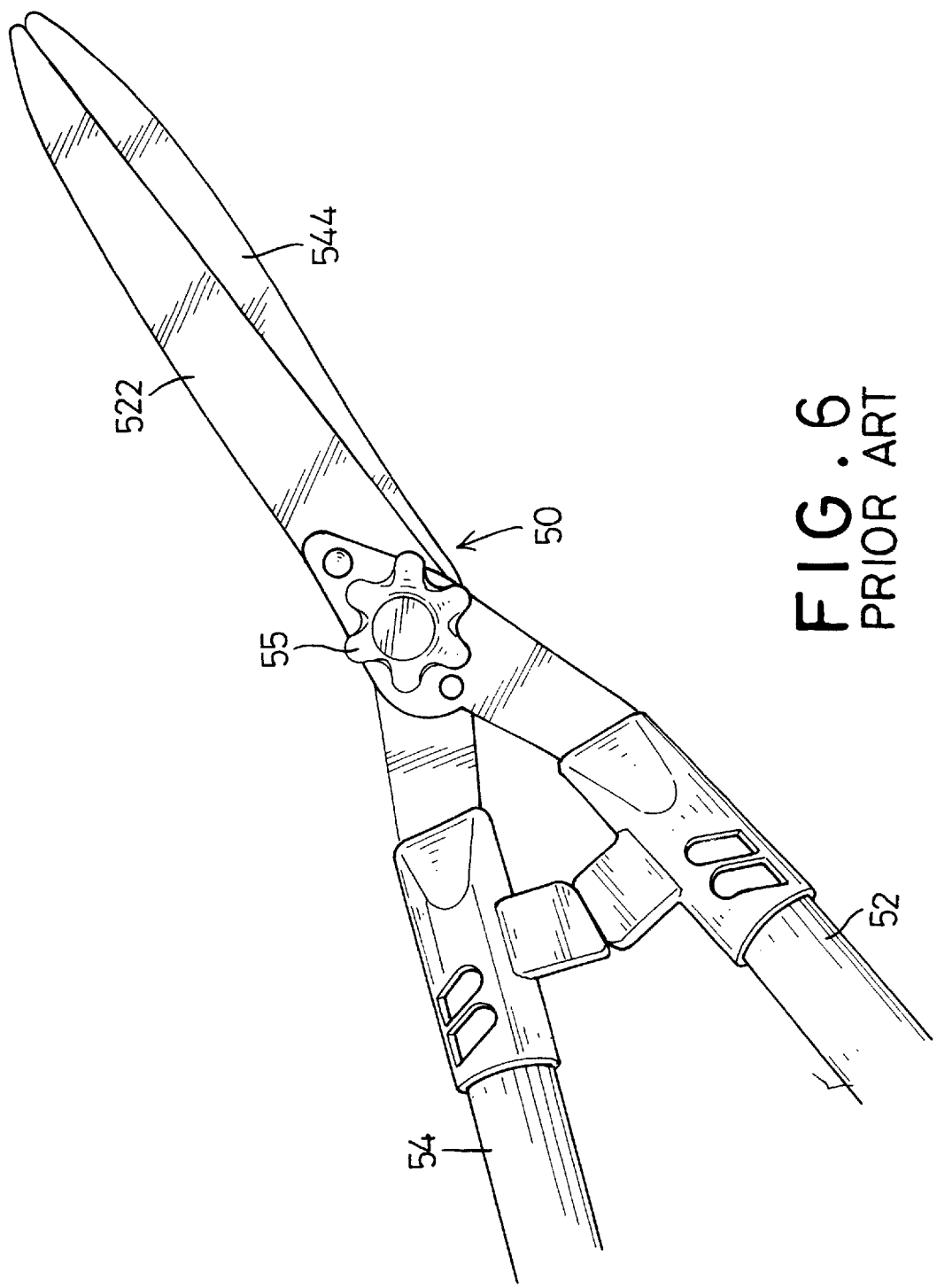
FIG. 6 is a perspective view of conventional hedge shears in accordance with the prior art.

With reference to FIGS. 4 and 5, the blades (20R, 20L) can be rotated when the blade drive bracket (36) rotates around the shaft (42) until the blades (20R, 20L) have the desired or necessary inclined angle. When the blades (20R, 20L) and the blade drive bracket (36) are rotated, the ball (348) in one detent (384) moves to another detent (384) to hold the blades (20R, 20L) in position.

The hedge shears as described have the following advantages. Because the blades (20R, 20L) of the hedge shears are able to rotate to adjust the cutting angle of the hedge shears, the user does not need to change his posture or the position of handles to steer the hedge shears for cutting, and the hedge shears are convenient to use. Additionally the user does not get tired easily, and his productivity and efficiency are improved.

It should be clear to those skilled in the art that further embodiments can be made without departing from the scope and spirit of the present invention. Even though numerous characteristics and advantages of the present invention have been set forth in the foregoing description, together with details of the structure and function of the invention, the disclosure is illustrative only, and changes can be made in detail, especially in matters of shape, size, and arrangement of parts within the principles of the invention to the full extent indicated by the broad general meaning of the terms in which the appended claims are expressed.

What is claimed is:

1. A hedge shear comprising:
 a pair of handles (10R, 10L), each handle (10R, 10L) having a grip (12), an attachment fitting (14) extending inward from each grip (12) and a handle drive slot (16) defined in the attachment fitting (14); and
 a pair of blades (20R, 20L) connected to the pair of handle (10R, 10L) with a rotatable connector (30), each blade (20R, 20L) having an enlarged proximal end (24), a cutting edge formed on an inner edge of the blade (20R, 20L) and a blade drive slot (242) defined in the enlarged proximal end (24),
 wherein the rotatable connector (30) is mounted between and connecting the handles (10R, 10L) and the blades (20R, 20L) and comprises a handle drive bracket (32), a blade drive bracket (36), a positioning device and a pivoting device (40), wherein
  the handle drive bracket (32) has a longitudinal handle drive plate with a front edge, two wings and a first elongated hole (322) defined in the longitudinal handle drive plate and aligning with the handle drive slots (16) in the attachment fittings (14), a rear transverse abutting plate (34) formed on the front edge of the longitudinal handle drive plate, and a rear pivot shaft hole (342) defined in the rear transverse abutting plate (34);
  the blade drive bracket (36) has a longitudinal blade drive plate with a rear edge, two wings and a second elongated hole (362) defined in the longitudinal blade drive plate and aligning with the blade drive slots (242) in the blades (20R, 20L), a front transverse abutting plate (38) formed on the rear edge of the blade drive bracket (36) to correspond to rear transverse abutting plate (34), and a pivot hole (382) defined in the front transverse abutting plate (38);
  the positioning device is mounted between and includes elements of the rear transverse and the front transverse abutting plates (34, 38) to hold the two transverse abutting plates (34, 38) in position; and
  the pivoting device (40) comprises a shaft (42) with a shoulder, two shaft hubs (46, 48) mounted on the shaft (42), wherein the shaft (42) has a front end and a rear end and penetrates the pivot shaft holes (342, 382) in the rear transverse and front transverse abutting plates (34, 38), and each shaft hub (46, 48) has a pin attached under the hub (46, 48), one shaft hub having the pin pass through the handle drive slots (16) and the first elongated hole (322) and the other shaft hub having the pin pass through the blade drive slots (242) and the second elongated hole (362).

2. The hedge shears as claimed in claim 1, wherein the positioning device comprises a locking hole (344) defined in rear transverse abutting plate (34);

multiple detents (384) defined in the front transverse abutting plate (38) in a circle to selectively correspond to the locking hole (344);

a spring (346) with a ball (348) secured inside the locking hole (344) to hold the ball (348) inside one corresponding detent (384); and a setscrew (345) screwed into the locking hole (344) to hold the spring (346) against the ball (348) inside the locking hole (344).

3. The hedge shears as claimed in claim 1, wherein each attachment fitting (14) has a first handle pivot hole (18) defined in the attachment fitting (14);

the handle drive bracket (32) has a handle fixing pivot hole (324) defined in each wing of the longitudinal handle drive plate to align with the corresponding handle pivot holes (18) in the attachment fitting (14) and are penetrated by a pin to pivotally connect the handle drive bracket (32) and the handles (10R, 10L) together;

each enlarged proximal portion of the blades (20L, 20R) has a blade pivot hole (244); and the blade drive bracket (36) has a blade fixing pivot hole (364) defined in each wing of the longitudinal blade drive plate to align with the corresponding blade pivot holes (244) and are penetrated by a pivot pin to pivotally combine the blade drive bracket (36) and the blades (20R, 20L) together.

4. The hedge shears as claimed in claim 2, wherein each attachment fitting (14) of the pair of handle has a handle pivot hole (18) defined in the attachment fitting (14);

the handle drive bracket (32) has a handle fixing pivot hole (324) defined in each wing of the longitudinal handle drive plate to align with the corresponding handle pivot holes (18) in the attachment fitting (14) and are penetrated by a pivot pin to pivotally connect the handle drive bracket (32) and the handles (10R, 10L) together;

each enlarged proximal portion of the pair of blades (20L, 20R) has a blade pivot hole (244); and the blade drive bracket (36) has a blade fixing pivot hole (364) defined in each wing of the longitudinal blade drive plate to align with the corresponding blade pivot holes (244) and are penetrated by a pivot pin to pivotally combine the blade drive bracket (36) and the blades (20R, 20L) together.

5. The hedge shears as claimed in claim 1, wherein the pivoting device further has a bushing (44) with a front end and a rear end mounted through the pivot shaft holes (342, 382) of the rear transverse and front transverse abutting plate (34, 38); and a flange is formed on an outer surface of the bushing (44) at the front end to hold the bushing (44) in position in the pivot shaft holes (342, 382) so another flange can be formed on the rear end of the bushing (44) to hold the rear transverse and the front transverse abutting plate (34, 38) together.

6. The hedge shears as claimed in claim 2, wherein the pivoting device further has a bushing (44) with a front end and a rear end mounted through the pivot shaft holes (342, 382) of the rear transverse and front transverse abutting plate (34, 38); and a flange is formed on an outer surface of the bushing (44) at the front end to hold the bushing (44) in position in the pivot shaft holes (342, 382) so another flange can be formed on the rear end of the bushing (44) to hold the rear transverse and the front transverse abutting plate (34, 38) together.

7. The hedge shears as claimed in claim 4, wherein the pivoting device further has a bushing (44) with a front end and a rear end mounted through the pivot shaft holes (342, 382) of the rear transverse and front transverse abutting plate (34, 38); and a flange is formed on an outer surface of the bushing (44) at the front end to hold the bushing (44) in position in the pivot shaft holes (342, 382) so another flange can be formed on the rear end of the bushing (44) to hold the rear transverse and the front transverse abutting plate (34, 38) together.

8. The hedge shears as claimed in claim 1, in which a washer (468) is mounted around a rear end of the shaft (42) and pressed against the shoulder of the shaft (42) and a spring (466) is mounted between the rear hub (16) and the washer (468).

9. The hedge shears as claimed in claim 2, in which a washer (468) is mounted around a rear end of the shaft (42) and pressed against the shoulder of the shaft (42) and a spring (466) is mounted between the rear hub (16) and the washer (468).

10. The hedge shears as claimed in claim 4, in which a washer (468) is mounted around a rear end of the shaft (42) and pressed against the shoulder of the shaft (42) and a spring (466) is mounted between the rear hub (16) and the washer (468).

11. The hedge shears as claimed in claim 7, in which a washer (468) is mounted around a rear end of the shaft (42) and pressed against the shoulder of the shaft (42) and a spring (466) is mounted between the rear hub (16) and the washer (468).

12. The hedge shears as claimed in claim 1, wherein the rear hub (46) secured on the handle drive bracket (32) has a tubular ring (462) for receiving one end of the shaft (42), a stub (464) with a threaded hole attached under the tubular ring (462) and a long bolt as the pin that passes through the handle drive slots (16) and the first elongated hole (322) and screws into the threaded hole; and the front hub (48) mounted on the blade drive bracket (36) has a nut (482) to hold the front end of the shaft (42), a rod (484) with a threaded free end attached under the nut (482), wherein the rod (484) passes through the blade drive slots (242) and the second elongated hole (362) and is secured with another nut at the threaded free end.

* * * * *